(12) United States Patent
Cok

(10) Patent No.: US 8,173,460 B2
(45) Date of Patent: May 8, 2012

(54) CONTROL CIRCUIT FOR STACKED OLED DEVICE

(75) Inventor: Ronald S. Cok, Rochester, NY (US)

(73) Assignee: Global OLED Technology LLC, Seoul (KR)

( * ) Notice: Subject to any disclaimer, the term of this patent is extended or adjusted under 35 U.S.C. 154(b) by 20 days.

(21) Appl. No.: 12/779,132

(22) Filed: May 13, 2010

(65) Prior Publication Data

US 2010/0221857 A1    Sep. 2, 2010

Related U.S. Application Data

(62) Division of application No. 11/534,234, filed on Sep. 22, 2006, now Pat. No. 7,760,165.

(51) Int. Cl.
*H01L 21/00* (2006.01)

(52) U.S. Cl. ............................................. 438/34; 345/82

(58) Field of Classification Search ...................... 438/34
See application file for complete search history.

(56) References Cited

U.S. PATENT DOCUMENTS

| | | |
|---|---|---|
| 4,769,292 A | 9/1988 | Tang et al. |
| 5,061,569 A | 10/1991 | Van Slyke et al. |
| 5,703,436 A | 12/1997 | Forrest et al. |
| 6,274,980 B1 | 8/2001 | Burrows et al. |
| 6,844,957 B2 | 1/2005 | Matsumoto et al. |
| 6,903,378 B2 | 6/2005 | Cok |
| 7,142,179 B2 | 11/2006 | Miller et al. |
| 7,463,222 B2 | 12/2008 | Fish et al. |
| 7,602,118 B2 | 10/2009 | Cok et al. |
| 7,791,571 B2 * | 9/2010 | Ohtani et al. ................... 345/82 |
| 2003/0112205 A1 * | 6/2003 | Yamada .......................... 345/32 |
| 2005/0236981 A1 | 10/2005 | Cok et al. |
| 2005/0243031 A1 * | 11/2005 | Fish et al. ....................... 345/76 |
| 2007/0165180 A1 * | 7/2007 | Cho .............................. 349/187 |
| 2007/0236430 A1 | 10/2007 | Fish |

* cited by examiner

*Primary Examiner* — Charles Garber
*Assistant Examiner* — Andre' C Stevenson
(74) *Attorney, Agent, or Firm* — Morgan, Lewis & Bockius LLP

(57) ABSTRACT

A plurality of organic light-emitting diode (OLED) control circuits, each circuit comprising three electrodes, a first electrode, a second electrode independently controlled from the first electrode, and a third electrode is connected in common with the third electrode from another OLED control circuit and independently controlled from the first and second electrode. Given a first and second OLED, the first electrode is connected to a first terminal of the first OLED, the second electrode is connected to a second terminal of the first OLED and to a first terminal of the second OLED, and the third electrode is connected to a second terminal of the second OLED. At least one bypass transistor, responsive to a bypass signal, connects the second electrode and third electrode.

2 Claims, 5 Drawing Sheets

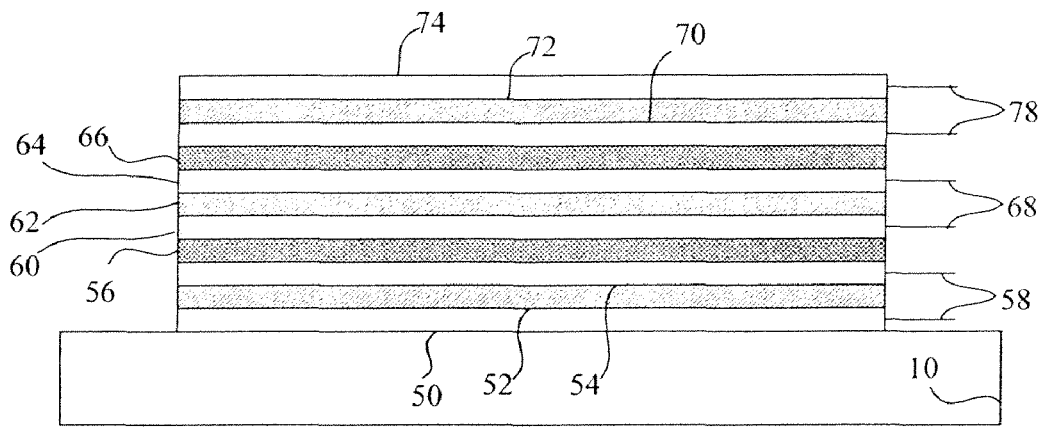
Fig. 5 - Prior art
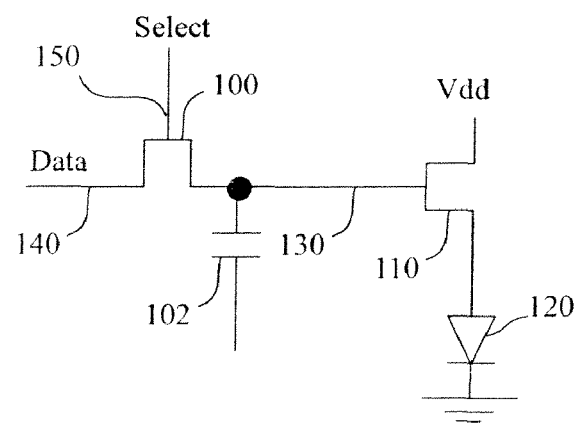
Fig. 6 - prior art

# CONTROL CIRCUIT FOR STACKED OLED DEVICE

This is a divisional application of application Ser. No. 11/534,234, filed on Sep. 22, 2006 now U.S. Pat. No. 7,760,165, which is hereby incorporated by reference.

FIELD OF THE INVENTION

The present invention relates to electronic circuits for organic light-emitting diode devices and, more particularly, to circuits useful for controlling stacked OLED devices.

BACKGROUND OF THE INVENTION

Organic light-emitting diode (OLED) devices, also referred to as organic electroluminescent (OEL) devices, have numerous well-known advantages over other flat-panel display devices currently in the market place. Among the potential advantages is brightness of light emission, relatively wide viewing angle, reduced device thickness, and reduced electrical power consumption compared to, for example, backlight displays.

Applications of OLED devices include active-matrix image displays, passive-matrix image displays, and area-lighting devices such as, for example, selective desktop lighting. Irrespective of the particular OLED device configuration tailored to these broad fields of applications, all OLEDs function on the same general principles. An organic electroluminescent (EL) medium structure is sandwiched between two electrodes. At least one of the electrodes is at least partially light transmissive. These electrodes are commonly referred to as an anode and a cathode in analogy to the terminals of a conventional diode. When an electrical potential is applied between the electrodes so that the anode is connected to the positive terminal of a voltage source and the cathode is connected to the negative terminal, the OLED is said to be forward biased. Positive charge carriers (holes) are injected from the anode into the EL medium structure, and negative charge carriers (electrons) are injected from the cathode. Such charge carrier injection causes current flow from the electrodes through the EL medium structure. Recombination of holes and electrons within a zone of the EL medium structure results in emission of light from this zone that is, appropriately, called the light-emitting zone or interface. The organic EL medium structure can be formed of a stack of sub-layers that can include small molecule layers or polymer layers. Such organic layers and sub-layers are well known and understood by those skilled in the OLED art.

Full-color OLED devices may employ a variety of organic materials to emit different colors of light. In this arrangement, the OLED device is patterned with different sets of organic materials, each set of organic materials associated with a particular color of light emitted. Each pixel in an active-matrix full-color OLED device typically employs each set of organic materials, for example to form a red, green, and blue sub-pixel. The patterning is typically done by evaporating layers of organic materials through a mask. In an alternative arrangement, a single set of organic materials emitting broadband light may be deposited in continuous layers with arrays of differently colored filters employed to create a full-color OLED device.

The emitted light is directed towards an observer, or towards an object to be illuminated, through the light transmissive electrode. If the light transmissive electrode is between the substrate and the light emissive elements of the OLED device, the device is called a bottom-emitting OLED device. Conversely, if the light transmissive electrode is not between the substrate and the light emissive elements, the device is referred to as a top-emitting OLED device. The present invention may be directed to either a top-emitting or bottom-emitting OLED device. In top-emitting OLED devices, light is emitted through an upper electrode or top electrode, typically but not necessarily the cathode, which has to be sufficiently light transmissive, while the lower electrode(s) or bottom electrode(s), typically but not necessarily the anode, can be made of relatively thick and electrically conductive metal compositions which can be optically opaque. Because light is emitted through an electrode, it is important that the electrode through which light is emitted be sufficiently light transmissive to avoid absorbing the emitted light. Typical prior-art materials proposed for such electrodes include indium tin oxide (ITO) and very thin layers of metal, for example silver, aluminum, magnesium or metal alloys including these metals.

A variety of circuits for controlling conventional, single-OLED devices are known in the prior art. For example, referring to FIG. 6, an OLED 120 is driven by a circuit comprising a drive transistor 110 in response to a data signal 130 stored in a capacitor 102 and deposited through a deposition transistor 100 by data and select control signals 140 and 150, respectively. The circuits typically comprise thin-film silicon materials, for example amorphous silicon or low-temperature polysilicon, as is known in the art. More complex circuits compensating for deficiencies in the materials or manufacturing are also known. However, such circuits are not suitable for driving stacked OLED devices.

Stacked OLED devices are employed to improve the resolution and reduce the current density in the OLED material layer, thereby improving lifetime. One approach to dealing with the aging problem, while maintaining the resolution of the display, is to stack two or more OLED light-emitting elements on top of each other thereby allowing the areas of the light-emitting elements to be larger to improve lifetime, and/or allowing more pixels to be provided for a given area, thereby improving resolution. This approach is described in U.S. Pat. No. 5,703,436 by Forrest et al., issued Dec. 30, 1997, and U.S. Pat. No. 6,274,980 by Burrows et al., issued Aug. 14, 2001. Stacked OLEDs utilize a stack of light-emitting elements located one above another over a substrate. Each light-emitting element may share one or both electrodes with a neighboring light emitting element in the stack and each electrode is individually connected to an external power source, thereby enabling individual control of each light-emitting element. However, forming such structures is difficult and, especially, providing external electrode connections may be problematic.

Referring to FIG. 5, a stacked OLED device is illustrated having a substrate 10 (either reflective, transparent, or opaque). Over the substrate 10, a first electrode 50 is formed. A first light-emitting layer 52 is formed over the first electrode 50 and a second electrode 54 formed over the first light-emitting layer 52. The first and second electrodes 50 and 54 provide current to the first light-emitting layer 52 through separate power connections 58. An insulating layer 56 may be provided over the second electrode 54 to isolate it electrically from the third electrode 60 formed over the insulating layer 56. A second light-emitting layer 62 is formed over the third electrode 60 and a fourth electrode 64 formed over the second light-emitting layer 62. The third and fourth electrodes 60 and 64 provide current to the second light-emitting layer 62 through separate power connections 68. An insulating layer 66 may be provided over the fourth electrode 64 to isolate it electrically from the fifth electrode 70 formed over the insulating layer 66. A third light-emitting layer 72 is formed over the fifth electrode 70 and a sixth electrode 74 formed over the third light-emitting layer 72. The fifth and sixth electrodes 70, 74, respectively, provide current to the third light-emitting layer 72 through separate power connections 78. The separate power connections 58, 68, 78 may be provided to independently control each of the first, second, and third light-emitting layers 52, 62, 72. The first, second, and third light-emitting layers 52, 62, 72 may emit three colors of light, for example red, green, and blue to form a full-color device.

U.S. Pat. No. 6,844,957 B2 entitled, "Three Level Stacked Reflective Display", issued Jun. 7, 2005 to Matsumoto et al., describes a structure and fabrication technology for a reflective, ambient light, low cost display incorporating a plurality of cells laid out side by side and stacked as many as three levels on top of each other. Each stack of three cells driven by an array of TFT's is positioned on the bottom layer. Each cell comprises a light transmitting front window, three levels of individual cells RGB (Red, Green, and Blue) stacked on top of each other, each level having its own individual electrode, each electrode being connected by vertical conducting via holes running through each transparent dielectric spacer and being connected to an individual TFT. However, control circuits are not provided.

Alternative devices employing stacked light-emitting layers and color filters are also known. Commonly assigned, co-pending U.S. application Ser. No. 11/087,522, entitled "OLED Display Device," filed Mar. 23, 2005 by Miller et al., which is hereby incorporated in its entirety by reference, describes a full-color OLED display device comprised of a substrate; an array of light-emitting elements, each element comprised of a first EL unit positioned between and in electrical contact with a first pair of electrodes and a second EL unit positioned between and in electrical contact with a second pair of electrodes and located above or below the first EL unit, wherein the first EL unit emits light primarily in only two of the red, green and blue portions of the visible spectrum, and the second EL unit emits light at least in the remaining third portion of the visible spectrum; and a means for selectively filtering the light produced by the first EL unit to filter light from one of the only two of the red, green and blue portions of the visible spectrum in some light-emitting elements and to filter light from the other of the only two of the red, green and blue portions of the visible spectrum in some other light-emitting elements. The disclosure includes a drive circuit, but this circuit is only useful for stacks having three independent electrodes. As noted above, it is difficult to construct these stacks.

U.S. Pat. No. 6,903,378 entitled, "Stacked OLED Display Having Improved Efficiency" by Cok, issued Jun. 7, 2005, which is hereby incorporated in its entirety by reference, describes an OLED device having a pixel, including a plurality of light transmissive filters; a first electrode layer defining a corresponding plurality of separately addressable electrodes; a first layer of white light emitting OLED material; a doped organic conductor layer; a second layer of white light emitting OLED material; and a second electrode layer defining a single electrode coextensive with the plurality of color filters. Similarly, US Publication 2005/0236981, filed Jun. 20, 2005, entitled "OLED Device" by Cok et al, which is hereby incorporated in its entirety by reference, describes an OLED device comprising a first layer of independently addressable light-emitting elements; and a second layer of independently addressable light-emitting elements located on top of the first layer; wherein one of the first and second layers of independently addressable light-emitting elements comprises a patterned array of red and blue light-emitting elements, and the other of the first and second layers of independently addressable light-emitting elements comprises an array of green light emitting elements. However, neither of these disclosures describes a drive circuit useful for controlling a stacked OLED device.

There is a need therefore for an improved control circuit for stacked organic light-emitting diode devices.

SUMMARY OF THE INVENTION

In accordance with one embodiment, the invention is directed towards a plurality of organic light-emitting diode (OLED) control circuits, each control circuit comprising:

a) three electrodes, a first electrode, a second electrode independently controlled from the first electrode, and a third electrode is connected in common with the third electrode from another OLED control circuit and independently controlled from the first and second electrode;

b) first and second OLEDs, wherein the first electrode is connected to a first terminal of the first OLED, the second electrode is connected to a second terminal of the first OLED and to a first terminal of the second OLED, and the third electrode is connected to a second terminal of the second OLED; and c) at least one bypass transistor, responsive to a bypass signal, and connecting the second electrode and third electrode.

ADVANTAGES

The present invention has the advantage that it provides a means to control stacked OLED devices having at least one common electrode amongst a plurality of electrodes for each OLED device.

BRIEF DESCRIPTION OF THE DRAWINGS

FIG. 5 is a cross section of a stacked OLED device according to the prior art; and FIG. 6 is a circuit diagram of a prior-art OLED drive circuit.

It will be understood that the figures are not to scale since the individual layers are too thin and the thickness differences of various layers too great to permit depiction to scale.

DETAILED DESCRIPTION OF THE INVENTION

Various embodiments of the present invention may be constructed by providing a substrate and forming a thin-film bypass transistor over the substrate. A first patterned electrode may be formed over the substrate either adjacent to or above the thin-film bypass transistor. A first OLED may be formed over the first patterned electrode and a second patterned electrode framed over the substrate and connected to the bypass transistor. A second OLED may be formed over the second electrode and a third unpatterned electrode formed over the second OLED and likewise connected to the bypass transistor. In further embodiments of the present invention, data deposition transistors and one or more capacitors for receiving signals to deposit a charge in the capacitors may be formed over the substrate, the charge representing a data value and providing a data signal. A first drive transistor connected in series with the first OLED, responsive to a data value signal and a second drive transistor connecting the first and second electrodes and connected in parallel with the first OLED, responsive to a data value signal may be formed. Control transistors responsive to control signals for providing data value signals to the drive transistors or for passing current through the OLEDs and a control signal for controlling the bypass transistors may also be formed.

Figure 1A:
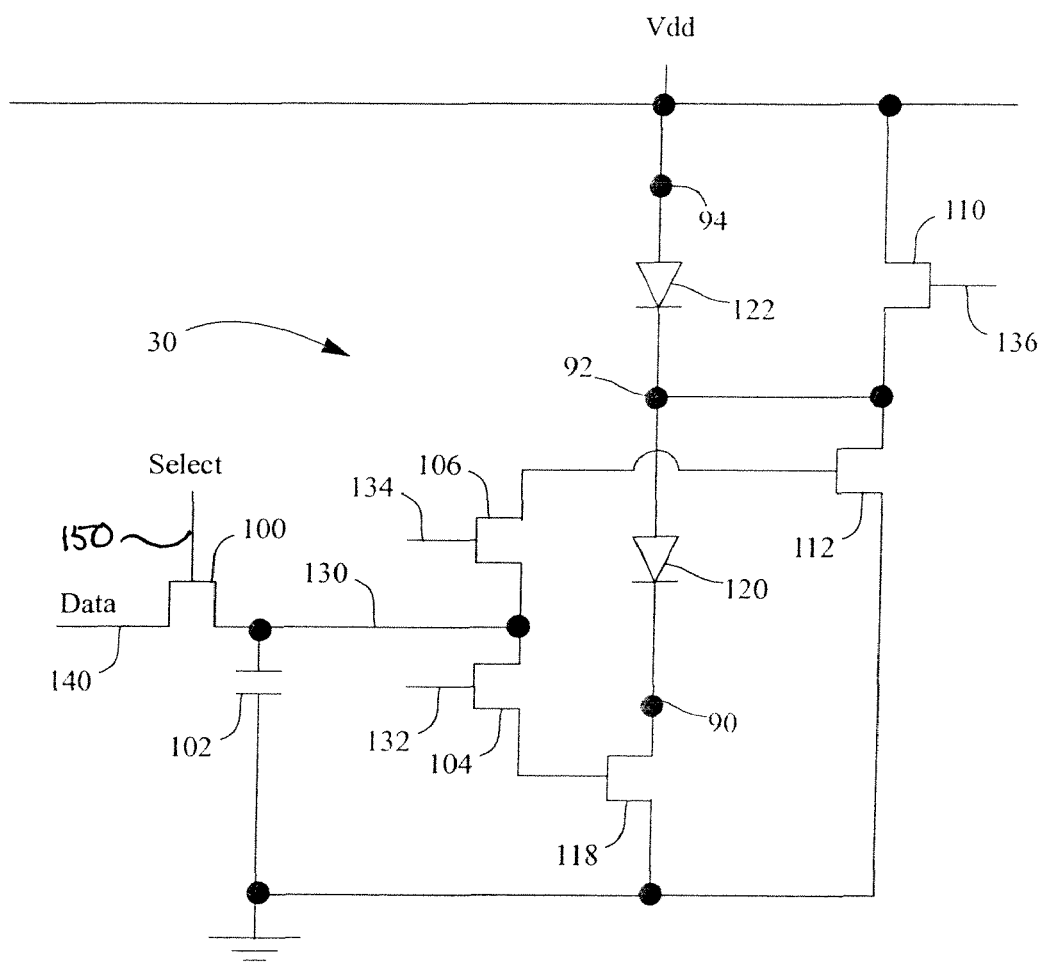
FIG. 1A illustrates a circuit employing time-sequential control of a stacked OLED device according to an embodiment of the present invention.
Figure 1B:
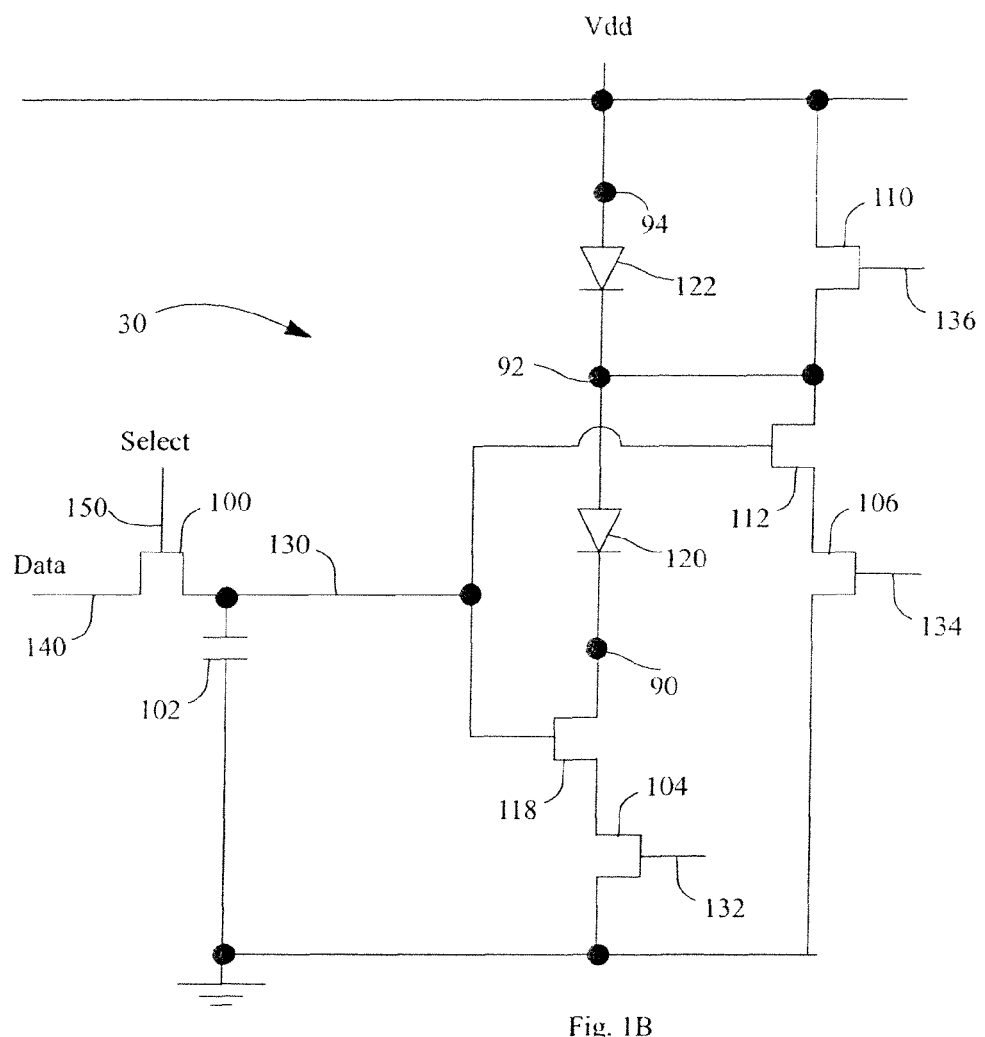
FIG. 1B illustrates a circuit employing time-sequential control of a stacked OLED device according to an alternative embodiment of the present invention.
Figure 2:
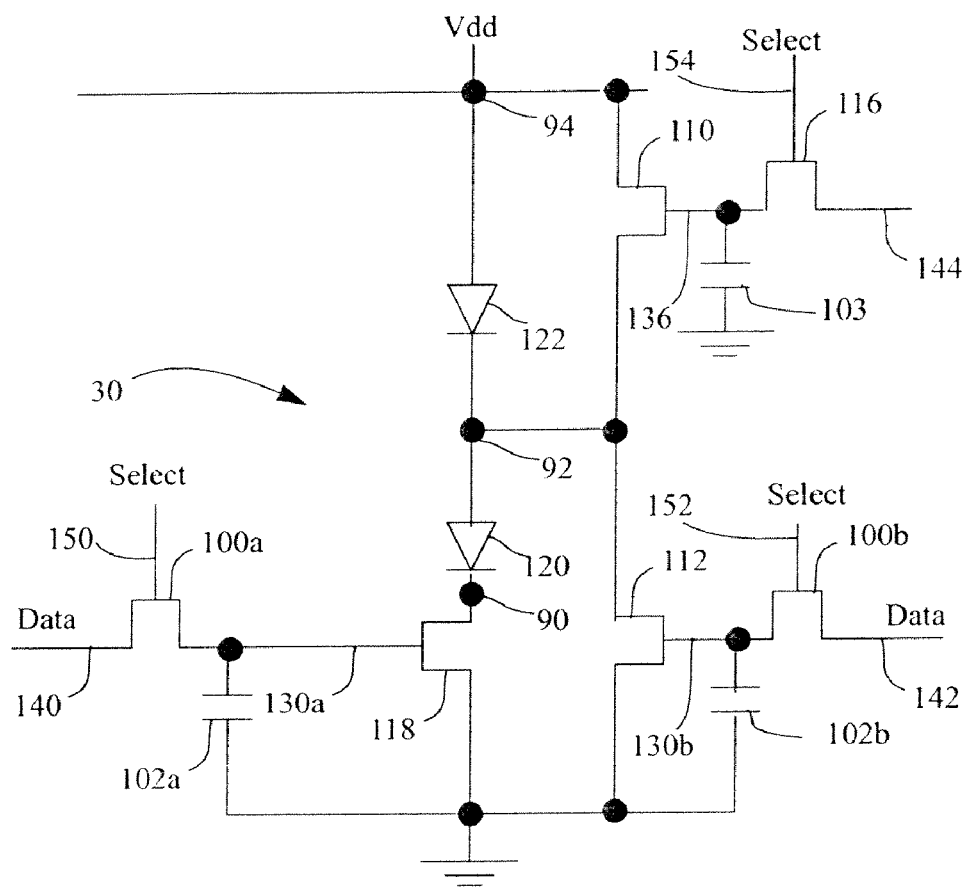
FIG. 2 illustrates a circuit employing continuous control of a stacked OLED device according to another embodiment of the present invention.

According to various embodiments of the present invention, the bypass transistor is connected in parallel with the second OLED and, preferably, the source and drain terminals of the bypass transistor are connected directly to the terminals of the second OLED, as shown in FIGS. 1A, 1B, and 2. However, other electronic components, for example, resistors, may be connected in series with the bypass transistor and in parallel with the second OLED. Such circuit arrangements are anticipated as being included in the present invention.

The present invention may be operated in either a time-sequential or continuous mode. In a time-sequential mode, a first temporal control signal may be the inverse of a second temporal control signal and the first temporal control signal may be the bypass control signal. In a continuous mode, a first data value signal may control a first drive transistor and a second data value signal may control a second drive transistor. A third bypass control signal may control the bypass transistor.

Referring to FIGS. 1A and 1B, in accordance with one embodiment of the present invention, a plurality of organic light-emitting diode control circuits 30 control a stacked OLED device with two OLEDs 120 and 122. Each of the plurality of circuits comprises three electrodes 90, 92, 94. A first electrode 90 is independently controlled from other control circuits 30 and the other electrodes 92, 94. A second electrode 92 is independently controlled from other control circuits 30 and the other electrodes 90, 94. A third electrode 94 is controlled in common with other third electrodes of the plurality of control circuits 30, but independently of the other electrodes 90, 92. That is, each of the third electrodes 94 of the plurality of control circuits 30 is electrically connected together. The first electrodes 90 and second electrode 92 together provide current to the first OLED 120 and the second electrode 92 and third electrode 94 together provide current to the second OLED 122. The first electrode 90 is connected to a first terminal of the first OLED 120, the second electrode 92 is connected to the second terminal of the first OLED 120 and to the first terminal of the second OLED 122, while the third electrode 94 is connected to the second terminal of the second OLED 122. The third electrode 94 is also common between the plurality of OLED circuits 30. At least one bypass transistor 110 responsive to a bypass signal 136 connects the second and third electrodes 92, 94 of OLED 122. The first, second, and third electrodes 90, 92, 94 may be connected to further elements of an active-matrix thin-film electronic circuit as described below.

In another embodiment of the present invention, one or more data deposition transistors 100 and one or more capacitors 102 for receiving signals (for example, data and select signals 140 and 150) deposit a charge in the one or more capacitors 102; the charge representing a data value and providing a data value signal 130. A first drive transistor 118 responsive to the data signal 130 may be connected in series with the first OLED 120. A second drive transistor 112 may be connected in series with the second OLED 122 and connected in parallel with the first OLED 120, and responsive to the data signal 130.

The present invention may be operated in a time sequential or temporal mode or a continuous mode. In the temporal mode, the first and second OLEDs 120, 122 are operated separately and not, generally, at the same time, so that one OLED (e.g. 120) is on and emitting light at a desired luminance and the other OLED (e.g. 122) is off during a first period and the other OLED (e.g. 122) is on and emitting light at a desired luminance and the one OLED (e.g. 120) is off during a second period. In a continuous mode, both OLEDs 120, 122 are operated at the same time and may emit light independently and at whatever luminance level is desired for each.

FIG. 1A illustrates a circuit useful for operating in a temporal mode. In this mode, for example, data and select signals 140 and 150, respectively, are operated to deposit a charge on capacitor 102 through data deposition transistor 100 to form a data signal 130. Such charge-deposition techniques are known in the art. The first temporal control signal 132, second temporal control signal 134, and bypass control signal 136 are then operated as follows to provide current to OLEDs 120, 122.

Still referring to FIG. 1A, if first temporal control signal 132 and bypass control signal 136 are turned off, the correspondingly connected control transistor 106 and bypass transistor 110 are turned off as well as first drive transistor 118. If second temporal control signal 134 is then turned on, the data signal 130 will be transmitted through second temporal control transistor 106 to second drive transistor 112. The desired amount of current will then flow through second OLED 122 and second drive transistor 112 to emit the desired luminance from second OLED 122.

Likewise, if second temporal control signal 134 (shown in FIG. 1B) is turned off, the correspondingly connected second control transistor 106 and second drive transistor 112 will be turned off. If first temporal control signal 132 and bypass control signal 136 are then turned on, the data value signal 130 will be transmitted through first control transistor 104 to first drive transistor 118. The bypass transistor 110 will form a connection between second and third electrodes 94 and 92, so that no significant voltage difference will exist across second OLED 122 and no current flows through second OLED 122. The desired amount of current flows through first OLED 120 and first drive transistor 118 to emit the desired luminance from first OLED 120.

If first temporal control signal 132 is the inverse of second temporal control signal 134, and bypass control signal 136 is connected to, or the same as, first temporal control signal 132, by alternating the polarity of first temporal control signal 132, a temporal alternation of light output between first and second OLEDs 120, 122 will be achieved. Each OLED outputs an amount of light corresponding to the data value stored in capacitor 102. By depositing a data value in capacitor 102 each time the first temporal control signal 132 is alternated, each OLED 120, 122 can output a different, desired luminance. It is preferred to alternate the first temporal control signal 132 at a sufficiently high rate, so that no flicker is perceived as the first and second OLEDs 120, 122 alternately output light.

If the first temporal control signal 132 and bypass control signal 136 are controlled separately, however, light may simultaneously emit from both OLED 120 and OLED 122. In this case, by turning bypass control signal 136 and second temporal control signal 134 off and first temporal control signal 132 on so that first drive transistor 118 is driven by the data signal 130 through first control transistor 104, current will flow through both first OLED 120 and second OLED 122. Since they are effectively connected in series, each OLED will emit light corresponding to an equal amount of current. Alternatively, by turning both first temporal control signal 132 and second temporal control signal 134 off, neither first OLED 120, nor second OLED 122 will have any current and, therefore, will not emit light.

As shown in FIG. 1B, in an alternative embodiment of the present invention, the control transistors 104 and 106 may be placed in series with the first and second drive transistors 118 and 112, respectively. In this case, the drive transistors 112, 118 are controlled directly by the data signal 130. Note that the designs of FIGS. 1a and 1b may be combined so that, for example, the drive transistor 118 may be controlled by the control transistor 104 (as in FIG. 1A), while the drive transistor 112 may be controlled by the data value signal 130, and the control transistor 106 placed in series with the drive transistor 112 (as in FIG. 1B) or vice versa.

In an alternative embodiment, the present invention may be operated in a continuous mode. In this mode, two data values are stored simultaneously, rather than alternately. Referring to FIG. 2, a first data value is deposited by employing, for example, data and select signals 140, 150, respectively, to deposit a charge on capacitor 102a through data deposition transistor 100a to form a first data value signal 130a. A second data value is deposited by employing, for example, data and select signals 142, 152 to deposit a charge on capacitor 102b through data deposition transistor 100b to form a second data value signal 130b. A third bypass value is deposited by employing, for example, data and select signals 144, 154, respectively, to deposit a charge on capacitor 103 through data deposition transistor 116 to form a bypass control signal 136. Such charge-deposition techniques are known in the art. The data signals 140, 142, and 144 may be combined in combination with select signals 150, 152, and 154 using control methods known in the art. The data value signals 130a, 130b, and bypass control signal 136 are operated as follows to provide current to the first and second OLEDs 120, 122.

Still referring to FIG. 2, if first data value signal 130a and second data value signal 130b are turned off, no current will flow and no light is emitted from first and second OLEDs 120, 122. If first data value signal 130b and bypass control signal 136 are turned off, current flows through both first and second OLEDs 120, 122 in equal amounts depending on the first data signal 130a and light is correspondingly emitted from both OLEDs 120, 122. If first data value signal 130a and bypass control signal 136 are turned off, current will flow through second OLED 122 only, depending on the second data value signal 130b, and light will correspondingly emit from second OLED 122. If second data value signal 130b is turned off and first data value signal 130a and bypass control signal 136 are turned on, current will flow through OLED 120 only, depending on the first data value signal 130a, and light will correspondingly emit from first OLED 120.

The first and second data value signals 130a, 130b and bypass control signal 136 may also be employed to drive different amounts of current through OLED 120 and OLED 122 to provide a complete range of luminance output combinations. If bypass control signal 136 is turned off, and both first data value signal 130a and second data value signal 130b are turned on, first OLED 120 will transmit the amount of current passed by first drive transistor 110 responsive to first data value signal 130a; and OLED 122 will transmit the sum of the amount of current passed by drive transistor 118 responsive to first data value signal 130a and the amount of current passed by drive transistor 112 responsive to second data value signal 130b. In this case, second OLED 122 passes more current than first OLED 120. Similarly, if first data value signal 130b is turned off and both first data value signal 130a and bypass control signal 136 are turned on, first OLED 120 will transmit the amount of current passed by first drive transistor 118 responsive to first data value signal 130a, and second OLED 122 will transmit the difference between the amount of current passed by first drive transistor 118 responsive to first data value signal 130a and the amount of current passed by bypass transistor 110 responsive to bypass control signal 136. In this case, first OLED 120 passes more current than second OLED 122.

Figure 3:
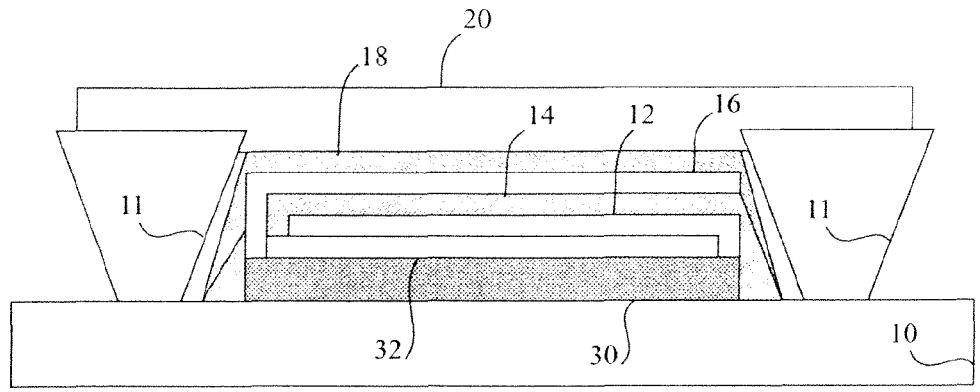
FIG. 3 is a cross section of a stacked OLED device operated by a circuit according to an embodiment of the present invention.

Referring to FIG. 3, another embodiment employs an organic light-emitting diode device comprising a first electrode 12 formed over a substrate 10, one-or-more organic first light-emitting layer(s) 14 formed over the first patterned electrode 12, a second electrode 16 shared between the first OLED 120 and second OLED 122 formed over the one-or-more first light-emitting layer(s) 14, one or more organic second light-emitting layer(s) 18 formed over the second electrode 16, and a third electrode 20 formed over the one-or-more second light-emitting layer(s) 18. The first and second electrodes 12, 16 are typically patterned to form separate and distinct light-emitting areas that are independently controlled by control circuit 30. The second electrode 16 is connected to a control circuit 30 by means of a channel or via formed (for example, by laser ablation) through the first light-emitting layer(s) 14. Third electrode 20 is electrically common to the plurality of control circuits 30; hence, electrode 20 may not be patterned. A thin-film electronic circuit 30 may be formed over the substrate 10, either beneath (as shown for a top-emitter configuration), or adjacent to (not shown for a bottom emitter configuration) the first electrode 12. Additional planarization and/or insulating layers 32 may be employed to isolate the thin-film electronic circuit 30 from the first electrode 12 and to provide a smooth surface for the deposition of subsequent layers. Such a stacked configuration of light-emitting layers 14 and 18 provides increased resolution by locating more light-emitting elements in a smaller substrate space and may provide increased lifetime for the light-emitters by increasing the size of the light-emitting areas; thereby, reducing the current density through the light-emitters at a constant brightness. Such an OLED device is also described in co-pending U.S. application Ser. No. 11/532,569.

In one embodiment of the present invention, the OLED device may be a top-emitting device and the first patterned electrode 12 may be reflective, while the second patterned electrode 16 and third common electrode 20 are transparent or partially transparent. In another embodiment of the present invention, the OLED device may be a bottom-emitting device and the third common electrode 20 may be reflective while the first patterned electrode 12 and the second patterned electrode 16 are transparent or partially transparent.

The patterned electrodes 12 and 16 together form distinct and separate light-emitting areas over the surface of the substrate 10, for example, sub-pixel elements in a display device. The thin-film electronic circuit 30, shown in FIGS. 1 and 2 in an active-matrix configuration, may drive these distinct and separate light-emitting areas by providing current through the patterned electrodes. In an alternative embodiment of the present invention, the electrodes are connected to busses and controlled in a passive-matrix configuration (not shown).

According to various embodiments of the present invention, the first and second one-or-more light-emitting layers 14 and 18, respectively, may be independently controllable to emit light separately or together. Moreover, the light-emitting layers 14 and 18 may each comprise a common light-emitting material layer over all of the light-emitting areas. The light-emitting layer(s) 14, 18 may emit different colors of light. Alternatively, the light-emitting materials comprising the light-emitting layers 14 and 18 may be patterned so that one light-emitting layer in one light-emitting area will employ one kind of light-emitting material to emit light of one color, while a different kind of light-emitting material in the other light-emitting layer may be employed in a different light-emitting area to emit light of a different color. Typically, in the prior art, organic materials are evaporated in layers over a substrate to form light-emitting layer(s). If no masking is employed, all of the light-emitting areas over the substrate have the same organic materials and will emit the same color of light in response to a current. If a precision shadow mask is employed, different light-emitting materials may be applied to different light-emitting areas. According to alternative embodiments of the present invention, either the first or second light-emitting layer(s) may be patterned with different light-emitting materials that can emit different colors of light in different light-emitting areas; or either the first or second light-emitting layer(s) may employ the same light-emitting materials and emit the same color of light in different light-emitting areas.

In a particular embodiment of the present invention, the patterned electrodes 12 and 16, as shown in FIG. 3, may form a plurality of distinct and separate light-emitting areas, and the first light-emitting layer(s) may emit the same first color of light in each of the plurality of light-emitting areas, and the second light-emitting layer(s) may emit the same second color of light in each of the plurality of light-emitting areas, wherein the first and second colors are different colors. A variety of different first and second color combinations may be employed. In some useful embodiments, complementary colors can be employed together to form a white light when both the first and second light-emitting layers 14 and 18 are energized simultaneously. For example, one of the first or second light-emitting layer(s) 14,18, respectively, may emit green light and the other of the first or second light-emitting layers may emit magenta light; or one of the first or second light-emitting layer(s) 14,18 may emit blue light and the other of the first or second light-emitting layers may emit yellow light; or one of the first or second light-emitting layer(s) 14,18 may emit red light and the other of the first or second light-emitting layers may emit cyan light.

Figure 4:
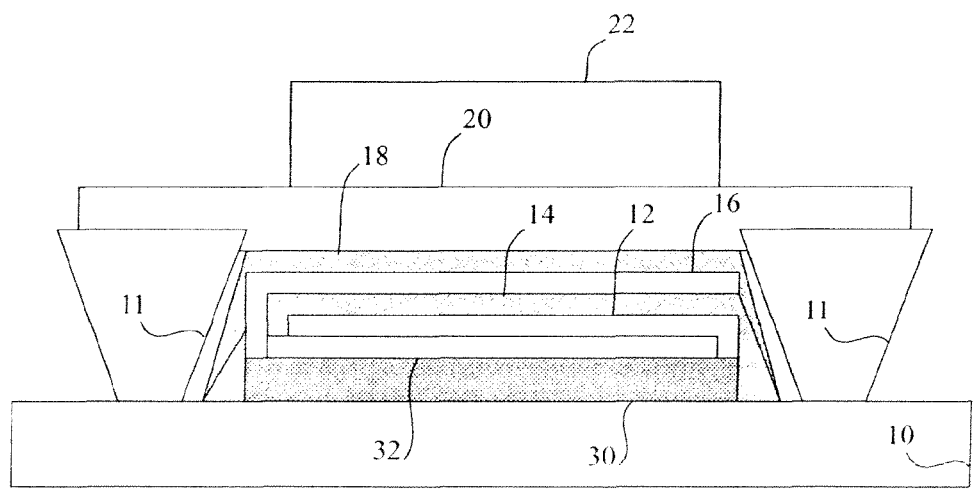
FIG. 4 is a cross section of a stacked OLED device, having a color filter, operated by a circuit according to an embodiment of the present invention.

This embodiment may be particularly useful in combination with color filters, as shown in FIG. 4. Different color filters may be employed in different light-emitting areas. Referring to FIG. 4, a color filter 22 is employed in a top-emitter configuration to filter the light output by the first and second light-emitting layers 14 and 18. Such an arrangement is useful to provide a full-color device without the need to pattern (for example with a shadow-mask) the light-emitting layers 14 and 18. According to various disclosures in the prior art, a single, white-light-emitting layer in combination with patterned red, green, and blue color filters can form a full-color device. However, such a prior-art arrangement is inefficient, because only approximately one third of the white light will pass through each of the color filters. In contrast, the present invention provides an improved energy efficiency by employing, for example, complementary colored emitters (e.g. green and magenta) together with patterned color filters that transmit two colors of light, rather than one (e.g. yellow). In this example, if the green light-emitting layer is energized to produce green light, it may pass through the yellow filter without absorption. If the magenta light-emitting layer is energized to produce magenta light, it may pass through the yellow filter to produce red, while the blue component of the magenta light will be absorbed. If a cyan filter is employed, the blue component of the magenta light may pass through while the red component of the magenta light is absorbed. In this embodiment, only one third of the light is absorbed at each light-emitting area, rather than the two thirds of the prior-art example. Hence, a full-color device may be obtained using unpatterned light-emitting layers and a patterned color filter array having two colors that has a higher efficiency than the conventional white emitter with red, green, and blue color filters. Similarly, blue and yellow emitters may be employed with cyan and magenta filters and red and cyan emitters may be employed with yellow and magenta filters.

In an alternative embodiment of the present invention, the patterned electrodes may for in a plurality of distinct and separate light-emitting areas, and one of the first and second light-emitting layer(s) may emit light of different colors in different light-emitting areas and the other of the first and second light-emitting layer(s) may emit light of the same color in all light-emitting areas. For example, the patterned light-emissive layer(s) may be patterned to emit red and blue light in different light-emitting areas while the unpatterned light-emissive layer may emit green light. In this case, the apparent resolution of the device is increased.

In yet another embodiment of the present invention, the patterned electrodes may form a plurality of distinct and separate light-emitting areas and both of the first and second light-emitting layer(s) may emit light of different colors in different light-emitting areas.

In another embodiment of the present invention, the first OLED may be inverted with respect to the second OLED. Each OLED may emit a different color of light in response to a current proved by the electrodes; the different colors may be complementary colors. For example, the different colors may be green and magenta, or red and cyan, or blue and yellow.

The third electrode may not be patterned and may be electrically connected to the third electrode of each of the plurality of circuits and the first and second electrodes may be patterned to form electrically unconnected and separate electrodes for each of the plurality of circuits. In a preferred embodiment of the present invention, the turn-on voltage of the bypass transistor is equal to or lower than the turn-on voltage of the second OLED. The various transistors of the present invention may comprise various types of silicon, for example, amorphous silicon, low-temperature polysilicon, microcrystalline silicon, or crystalline silicon. Alternatively, the various transistors of the present invention may comprise organic materials, for example, pentacene.

In the prior art, transparent electrodes are formed of transparent, conductive metal oxides, for example indium tin oxide (ITO). This material is typically deposited by sputtering and is patterned either through photolithographic means or with shadow masks. While photolithographic processes may be suitable for the first patterned electrode, such processes are very problematic in the presence of light-emitting layers, for example, organic layers, such as the first light-emitting layer, because they will damage the light-emitting layers.

Hence, the second, patterned shared electrode 16 (shown in FIG. 3) may be formed through deposition over the first light-emitting layer 14 without the use of shadow masks or photolithographic processes. The shadowing pillars 11 at each side of the light-emitting areas are formed such that the top portion of the pillar 11 is wider than the bottom portion. Therefore, any deposition process, such as sputtering, that relies upon a directional deposition will not form material in the undercut areas at the bottom of the shadowing pillars 11. In order to electrically isolate the second electrode 16 into separate and distinct areas, the first and second patterned electrodes form a plurality of distinct and separate light-emitting areas separated by a grid of shadowing pillars. The grid may be continuous and effectively form a plurality of wells with shadowing walls. The grid may have rectangular openings corresponding to the light-emitting areas; alternatively, other shapes may be employed. When the material for the second electrode 16 is deposited, it may also deposit over the via formed through the first light-emitting layer(s), thereby connecting the second electrode 16 to an underlying bus or thin-film electrical circuit 30.

After the second electrode 16 is deposited, the second light-emitting layer(s) 18 may be deposited in a fashion similar to that of the first light-emitting layer 14. Over the second light-emitting layer(s) 18, the third common electrode 20 is deposited. While the third electrode 20 may be formed in a patterned arrangement like the second electrode 16, it is difficult to form a via through the second electrode 16. Laser ablation is much more difficult to perform through transparent metal oxides than through organic materials and photolithographic processes may very well destroy the second (and first) light-emitting layer(s). Hence, the third electrode 20 (shown in FIG. 3) may be a common electrode that is electrically connected to all of the light emitting areas. To construct such a common electrode, the shadowing pillars 11 may be of a height slightly greater than the height of the layers beneath the second light-emitting layer(s) 18 (to enable shadowed deposition of the electrodes 12 and 16); but not much greater, so that the deposition of the third electrode 20 can be continuous over the tops of the shadowing pillars 11, without causing any breaks in the third electrode 20. The third electrode may be thicker than the second electrode to help maintain the continuity of the third electrode 20. In a bottom emitter configuration, a very thick layer of reflective metal (e.g. 400 nm or more) may be employed. In a top-emitter configuration a transparent conductor, such as ITO, may be employed.

Because the third electrode 20 is common to all of the light-emitting areas, the second electrode 16 must provide current to both the first and second light-emitting layers 14 and 18. Therefore, second electrode 16 is shared between the first and second light-emitting layers 14 and 18.

Thin-film electronic components in circuit 30 can be formed using known lithographic techniques. The deposition of metal and metal oxide layers using techniques such as sputtering and evaporation are also known. The evaporation of organic materials with and without masks is likewise known in the art. Shadowing pillars 11 may be aimed using photo-resistive materials and etchants. The performance of the present invention may be improved by employing light scattering techniques as described in, for example, co-pending, commonly assigned U.S. Ser. No. 11/065,082, filed Feb. 24, 2005 entitled "OLED Device Having Improved Light Output" by Cok, which is hereby incorporated by reference in its entirety.

OLED devices of this invention can employ various well-known optical effects in order to enhance their properties, if desired. This includes optimizing layer thicknesses to yield maximum light transmission, providing anti-glare or anti-reflection coatings over the display, or providing colored, neutral density, or color conversion filters over the display. Filters, and anti-glare or anti-reflection coatings may be specifically provided over the cover or as part of the cover.

The present invention may be employed in display devices or in area illumination devices. In a preferred embodiment, the present invention is employed in a flat-panel OLED device composed of small molecule or polymeric OLEDs as disclosed in, but not limited to U.S. Pat. No. 4,769,292, issued Sep. 6, 1988 to Tang et al., and U.S. Pat. No. 5,061,569, issued Oct. 29, 1991 to VanSlyke et al. Many combinations and variations of organic light-emitting displays can be used to fabricate such a device, including both active- and passive-matrix OLED displays having either a top- or bottom-emitter architecture.

The invention has been described in detail with particular reference to certain preferred embodiments thereof, but it will be understood that variations and modifications can be effected within the spirit and scope of the invention.

PARTS LIST 10 substrate
11 shadowing pillars
12 first patterned electrode
14 first light-emitting layers
16 second patterned shared electrode
18 second light-emitting layers
20 third common electrode
22 color filter
30 thin-film electronic circuit
32 planarizing insulator
90 first electrode
92 second electrode
94 third electrode
100, 100a, 100b data deposition transistor
102, 102a, 102b capacitor
103 capacitor
104 first control transistor
106 second control transistor
110 bypass transistor
112 second drive transistor
116 data deposition transistor
118 first drive transistor
120 first OLED
122 second OLED
130 data value signal
130a first data value signal
130b second data value signal
132 first temporal control signal
134 second temporal control signal
136 bypass control signal
140 data signal
142 data signal
144 data signal
150 select signal
152 select signal
154 select signal

The invention claimed is:

1. A method of making a plurality of organic light-emitting diodes and control circuits, comprising the steps of:
   a) providing a substrate;
   b) forming a thin-film bypass transistor over the substrate;
   c) forming a first patterned electrode over the substrate;
   d) forming a first OLED over the first electrode;
   e) forming a second patterned electrode over the substrate and connected to the bypass transistor;

f) forming a second OLED over the second electrode; and
g) forming an unpatterned electrode over the second OLED and connected to the bypass transistor.

2. The method of claim 1, further comprising one or more of the steps of:
 a. forming over the substrate one or more data deposition transistors and capacitors responsive to control signals for depositing a charge forming a data value signal on the capacitor(s);
 b. forming a drive transistor in series with the first or second OLED and responsive to the data value signal; and
 c. forming control transistors for providing the data value signal(s) to the drive transistor or for controlling current through the drive transistor.

\* \* \* \* \*